United States Patent Office 3,632,625
Patented Jan. 4, 1972

3,632,625
METHOD OF PRODUCING KETONITRILES
Helmut aus der Funten, Butttergasse, 5215 Mondorf, Germany; Hermann Richtzenhain, Post Marialinden, 5066 Schwellenbach, Germany; and Moustafa El-Chahawi, 35 Zundorfer weg, 5211 Lulsdorf, Germany
No Drawing. Filed July 1, 1968, Ser. No. 743,583
Claims priority, application Germany, June 30, 1967, D 53,487
Int. Cl. C07c 121/46, 121/52, 121/34
U.S. Cl. 260—464  12 Claims

ABSTRACT OF THE DISCLOSURE

Catalytic hydrogenation of unsaturated ketonitriles of the formula:

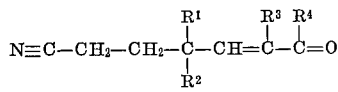

wherein $R^1$ and $R^2$ are 1 to 4 carbon atom alkyl groups; $R^3$ is hydrogen or a 1 to 4 carbon atom alkyl group; and $R^4$ is an aryl group or a 1 to 4 carbon atom alkyl group or $R^3$, $R^4$ and their attached carbon atoms may be a 4 to 5 carbon ring; at temperatures of about —20 to +70° C. in the presence of a reduced noble metal of the platinum group.

---

This invention relates to the production of saturated keto and nitrile containing compounds. It more particularly refers to a novel method of saturating olefinic unsaturation in keto and nitrile containing compounds.

The catalytic hydrogenation of carbon-carbon double bonds is a well known reaction. Unsaturated aldehydes or ketones, on the other hand, can be converted into the corresponding saturated compounds in good yield only under selected conditions, since the carbonyl group is also easily hydrogenated. It is known that nitrile groups can easily be hydrogenated to primary amines, which hydrogenation produces secondary amines as by-products. Upon the hydrogenation of unsaturated ketonitriles, it was to be expected therefore that the carbon double bond, the carbonyl group and the nitrile group would be hydrogenated simultaneously and that a variety of reaction products would thereby be produced.

It is therefor an object of this invention to provide a novel process of saturating olefinic unsaturation in ketone and nitrile containing olefinic compounds.

It is another object of this invention to provide such a process which is not subject to the disadvantages of the known prior art; that is, to provide such a process which is capable of selectively hydrogenating the olefinic unsaturation while to a large measure leaving unaffected the nitrile and ketone unsaturation.

Other and additional objects of this invention will become apparent from a consideration of this entire specification, including the claims thereof.

In accord with and fulfilling these objects, one aspect of this invention resides in a process comprising the catalytic hydrogenation of compounds of the formula:

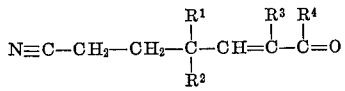

wherein $R^1$ and $R^2$ are 1 to 4 carbon atom alkyl groups; $R^3$ is hydrogen or a 1 to 4 carbon atom alkyl group; and $R^4$ is an aryl or a 1 to 4 carbon atom alkyl group; wherein further $R^3$ and $R^4$ may, together with the carbon atoms to which they are directly attached, be a carbocyclic ring of about 5 or 6 carbon atoms with or without lower alkyl substitution. The catalytic hydrogenation is carried out at about —20 to +70° C. in the presence of a platinum group noble metal. It is preferred to carry out the reaction at about 0 to 40° C. The catalysts are preferably reduced noble metal oxides which may or may not be used deposited on suitable, conventional carrier material.

It is most surprising that the hydrogenation of the present invention is so selective that saturated ketonitrile exactly corresponding to the unsaturated reactant are obtained in yields of 93 to 99%.

The compounds entering into consideration as starting material for the present invention, that is the unsaturated ketonitriles, are obtainable, for instance, by condensation of β-cyanethylated aldehydes of the general formula:

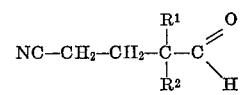

in which $R^1$ and $R^2$ have the meaning already indicated, with ketones which have at least 2 hydrogen atoms on a carbon atom adjacent the carbonyl group. Examples of such unsaturated ketonitriles are:

5,5-dimethyl-7-cyano-hepten-3-one-2
5-ethyl-5-n-butyl-7-cyano-hepten-3-one-2
3,5,5-trimethyl-7-cyano-hepten-3-one-2
3-methyl-5-ethyl-5-n-butyl-7-cyano-hepten-3-one-2
2,6,6-trimethyl-7-cyano-octen-4-one-3
phenyl-(3,3-dimethyl-5-cyano-penten-1-yl)-ketone
phenyl-(3-ethyl-3-n-butyl-5-cyano-penten-1-yl)-ketone
2-(2,2-dimethyl-4-cyano-butylidene)-cyclohexanone
2-(2-ethyl-2-n-butyl-4-cyano-butylidene)-cyclohexanone
2,7,7-trimethyl-9-cyano-nonen-5-one-4, or
3-isopropyl-5,5-dimethyl-7-cyano-hepten-3-one-2

These ketone compounds can be prepared by reacting α,α-dialkyl-γ-cyano-butyraldehydes with ketones in the presence of basic condensation agents within the range of —20 to +100° C. The ketones must contain reactive methyl or methylene groups. The basic condensation agents are used in quantities of 0.03 to 5 mol percent, referred to the α,α-dialkyl-γ-cyano-butyraldehydes. Suitable basic condensation agents are the hydroxides, carbonates, alcoholates, hydrides and amides of the alkali metals, hydroxides or alcoholates of the alkaline earth metals, tertiary amines, quaternary ammonium hydroxides or basic ion exchangers.

The hydrogenation of the unsaturated ketonitriles in accordance with the present invention is carried out in the presence of noble-metal catalysts. The metals obtained by reduction of their oxides, such as platinum or palladium oxide, have proven particularly suitable, as well as noble metals applied on ordinary carrier substances, such as palladium on calcium carbonate or barium sulfate or platinum on carbon, etc.

The hydrogenation must be carried out at relatively low temperatures within the range of —20 to +70° C. The hydrogenation is preferably effected at 0-40° C. At temperatures above 70° C., as a matter of fact, there is a strong increase in the side reactions with an increase in the temperature. Thus, for instance, in hydrogenation product obtained at higher temperature has a strongly basic reaction as a result of reduction of the nitrile group to amino groups, while the hydrogenation products prepared under the conditions of the invention contain only traces of amines.

The hydrogenation can be carried out without excess hydrogen pressure, but in order to obtain a high rate of hydrogenation, a hydrogen pressure of up to about 50 atmospheres gauge is preferred. In individual cases, even higher pressures can be employed.

The reaction can be carried with or without a solvent. Where such diluent or solvent is preferably used, there may be employed lower alcohols, such as methanol, ethanol and isopropanol. Other inert solvents can also be used, such as diethyl ether, dioxane, tetrahydrofuran or 1,2-dimethoxy ethane. Esters, such as ethyl acetate, can also be used.

Hydrogen is used in the purity customary for hydrogenations with nobel-metal catalysts.

The reaction product can be worked up in extremely simple manner, since it is merely necessary to filter off the catalyst and free the reaction product from the solvent.

By the method of the invention, the following compounds can be prepared from the starting materials mentioned above:

5,5-dimethyl-7-cyano-heptanone-2
5-ethyl-5-n-butyl-7-cyano-heptanone-2
3,5,5-trimethyl-7-cyano-heptanone-2
3-methyl-5-ethyl-5-n-butyl-7-cyano-heptanone-2
2,6,6-trimethyl-8-cyano-octanone-3
phenyl-(3,3-dimethyl-5-cyano-pentyl)-ketone
phenyl-(3-ethyl-3-n-butyl-5-cyano-pentyl)-ketone
2-(2,2-dimethyl-4-cyano-butyl)-cyclohexanone
2-(2-ethyl-2-n-butyl-4-cyano-butyl)-cyclohexanone
2,7,7-trimethyl-9-cyano-nonanone-4 or
5,5-dimethyl-3-isopropyl-7-cyano-heptanone-2

The saturated ketonitriles prepared in accordance with the invention are new compounds which represent valuable intermediate products for the production of substituted diamines, aminocarboxylic acids and dicarboxylic acids having at least 7 carbon atoms which heretofore could be obtained only with difficulty. They can also be used per se as stabilizers, solvents, extractants, water-repelling agents and plasticizers for special purposes.

The method of preparing ketonitriles in accordance with the present invention is illustrated by the following examples which are not limiting.

EXAMPLE 1

5,5-dimethyl-7-cyano-heptanone-2

15 g. Pd on $CaCO_3$ (Pd content 5%) were introduced under nitrogen into 1 liter of methanol in a 5-liter autoclave and activated for 10 minutes at room temperature with hydrogen of 10 atm. ga. After addition of a solution of 1485 g. of 5,5-dimethyl-7-cyano-hepten-3-one-(2) and 500 ml. of methanol, the autoclave was again briefly flushed with hydrogen and, with the agitator stopped, 40 atm. ga. of hydrogen was impressed. After the starting of the agitator, the pressure dropped rapidly to 10 atm. ga. and the temperature increased to 25° C. By again introducing hydrogen 6 times to the pressure of 40 atm. ga., the loss in pressure caused by the absorption of hydrogen was counteracted. The temperature increased slowly to 40° C. The hydrogenation was complete in 10 minutes. The excess material was blown off and the contents of the autoclave filtered off from the catalyst under nitrogen, the methanol distilled off and the residue fractionated through a 30 cm. Vigreux column under vacuum. After initial runnings of 28 g. at 112–114° C./0.2 mm. Hg, the main portion of 5,5-dimethyl-7-cyano-heptanone-(2) boils uniformly at 114–115° C./0.2 mm. Hg.

Yield 1459 g. (97% of the theoretical yield) $n_D^{20}$: 1.4520 $C_{10}H_{17}NO$ (mol. wt. 167).

Calculated (percent): C, 71.79; H, 10.24; N, 8.37. Found (percent): C, 71.82; H, 10.15; N. 8.58.

EXAMPLE 2

5,5-dimethyl-7-cyano-heptanone-2

165 g. of 5,5-dimethyl-7-cyano-hepten-3-one-(2), 500 ml. of methanol and 2 g. of catalyst (5% by weight platinum on carbon) were subjected in an autoclave provided with agitator at 30–40 atm. ga. and 25–35° C. to the action of hydrogen. The calculated quantity of hydrogen was absorbed within 2 hours. After removal of the catalyst and of the solvent, the residue was distilled.

Yield of 5,5-dimethyl-7-cyano-heptanone-(2): 153.9 g. (=94% of the theoretical yield).

EXAMPLES 3 to 8

In a manner similar to Example 1, there were prepared various saturated ketonitriles. These examples are summarized in the following table.

EXAMPLES 3-8

| a | R¹ | R² | R³ | R⁴ | c | d | e | f | g | h | i | j |
|---|---|---|---|---|---|---|---|---|---|---|---|---|
| 3 | —$CH_3$ | —$CH_3$ | —$CH_3$ | —$CH_3$ | 5 wt. percent Pd/$CaCO_3$ | 1 | Ethanol | 40 | 40 | 0.5 | A | 99 |
| 4 | —$CH_3$ | —$CH_3$ | —H | —CH(CH₃)(CH₃) | 10 wt. percent Pd/Kohle | 0.5 | do | 10 | 25 | 0.5 | B | 99 |
| 5 | —$CH_3$ | —$CH_3$ | —H or —CH(CH₃)(CH₃) | —CH₂—CH(CH₃)(CH₃) or CH₃ | 5 wt. percent Pd/$Al_2O_3$ | 1 | Methanol | 30 | 40 | 1 | C | 98 |
| 6 | —$CH_3$ | —H | —$C_6H_5$ | | do | 1 | Dioxan | 50 | 40 | 0.5 | D | 94 |
| 7 | —$CH_3$ | —$CH_3$ | Cyclohexane | | 5 wt. percent Pd/$CaCO_3$ | 1 | Isopropanol | 80 | 40 | 1 | E | 93 |
| 8 | —$C_2H_5$ | —$C_4H_9$ | —$CH_3$ | | do | 0.5 | Ethanol | 40 | 40 | 1 | F | 96 |

NOTE.—a=Example Number; b=Substituents corresponding to formulas; c=Type of catalyst; d=Percent catalyst referred to nitrile used; e=Solvent; f=Pressure (atm. ga.); g=Temperature (° C.); h=Reaction time (hours); i=Product; j=Percent yield.

Physical properties of products A–F (A) 3,5,5 - trimethyl - 7 - cyano-heptanone - 2: $C_{11}H_{19}NO$ (mol. wt. 181.3) $n_D^{20}$: 1.4531. Calculated (percent): C. 72.87; H, 10.56; N, 7.73. Found (percent): C, 72.69; H. 10.58; N, 7.86. B.P. 0.03: 94–96° C.

(B) 2,6,6 - trimethyl - 8 - cyano - octanone - 3: $C_{12}H_{21}NO$ (mol. wt. 195.3) $n_D^{20}$: 1.4521. Calculated (percent): C, 73.79; H, 10.84; N, 7.16. Found (percent): C, 73.92; H, 10.74; N, 7.23. B.P. 0.2: 97–98° C.

(C) 2,7,7 - trimethyl - 9 - cyano-nonanone 4- or 3-isopropyl - 5,5 - dimethyl - 7 - cyano - heptanone - 2: $C_{13}H_{23}NO$ (mol. wt. 209.3) $n_D^{20}$: 1.4519. Calculated (percent): C. 74.69; H, 11.00; N, 6.69. Found (percent): C. 74.53; H, 10.81; N, 6.60. B.P. 0.3: 116° C.

(D) Phenyl - (3,3 - dimethyl - 5 - cyano-pentyl)-ketone: $C_{15}H_{19}NO$ (mol. wt. 229.3). Calculated (percent): C. 78.57; H, 8.35; N, 6.11. Found (percent): C, 78.90; H, 8.28; N, 6.25. B.P. 0.4: 162–163° C. M.P. 31.5° C. $n_D^{20}$: 1.5229.

(E) 2 - (2,2 - dimethyl - 4 - cyano-butyl) - cyclohexanone: $C_{13}H_{21}NO$ (mol. wt. 207.3). Calculated (percent): C, 75.32; H, 10.21; N, 6.76. Found (percent): C, 74.87; H, 10.11; N, 7.25. B.P. 0.3: 129–129.5° C. $n_D^{20}$: 1.4771.

The 2 - (2,2 - dimethyl - 4-cyano-butylidene)-cyclohexanone required as starting material for the production of compound E was prepared by the following method:

Into a well agitated mixture of 1000 g. of cyclohexanone and 50 ml. of 50 percent caustic potash solution, 1250 g. of α,α-dimethyl-γ-cyano-butyraldehyde were added drop by drop at room temperature over the course of 2 hours. The mixture was thereupon heated for 6 hours at 48° C. and, after cooling, neutralized with dilute hydrochloric acid. From the organic phase there was obtained by vacuum distillation a fraction of B.P. 0.35 145–161° C. from which 2-(2,2-dimethyl-4-cyano-butylidene)-cyclohexanone crystallized out.

M.P. 54.5° C. $C_{13}H_{19}NO$ (mol. wt. 205.3). Calculated (percent): C, 76.05; H, 9.32; N, 6.82. Found (percent): C, 75.78; H, 9.14; N, 7.02.

(F) 5 - ethyl - 5 - butyl - 7 - cyano-heptanone - 2: $C_{14}H_{25}NO$ (mol. wt. 223.4). Calculated (percent): C, 75.27; H, 11.28; N, 6.27. Found (percent): C, 74.93; H, 11.38; N, 6.39. B.P. 0.4: 138° C. $n_D^{20}$: 1.4643.

The ketonitriles of the above examples are all convertible into their corresponding amino carboxylic acids by known techniques. For example, the pendant nitrile group may be hydrolyzed in the known manner to a carboxylic acid and the ketone group can be converted into an amine group by known amination techniques. Conversely, the ketonitriles may be oxidized into carboxylic acid nitriles, esterified to mask the acid and then the nitrile reduced to an amine. The ester can then be saponified back to free acid.

The saturated ketonitriles of the invention can be used for producing the corresponding saturated diamines by reductive amination of the carbonyl group and hydrogenation of the nitrile group as described in our copending application 633,420, using the possibility to perform this reaction in several steps. The reaction will be performed without or in an inert solvent at temperatures of from 50 to 200° C., as more specificly described there.

The resulting solution of the product according to the present invention may be used to perform the reaction of the said copending application.

EXAMPLE 9

1459 g. of 5,5-dimethyl-7-cyano-heptanone-(2) were introduced together with one liter of ethanol and 200 g. of nickel-kieselguhr catalyst (Girdler G 49 A) into an autoclave which had previously been flushed with nitrogen and thereupon 600 ml. of liquid ammonia were added from a dosing vessel. After forcing in 80 atmospheres gauge of hydrogen, the heating was carried out under agitation. The hydrogen absorption commenced very strongly at 80 to 100° C. The pressure which was lost was compensated for by continuous addition of hydrogen, the temperature slowly increasing thereby to 130 to 140° C. The absorption of hydrogen was complete at the end of 1½ hours. After cooling, the catalyst was filtered off and washed out with alcohol. After distillation of ammonia and solvent, the residue was fractionated in vacuum in a 30 cm. Vigreux column. The yield of 4,4-dimethyl-1,7-diamino-octane of $BP_{15}$: 120–122° C. amounted to 1361 g. (90.5% of theoretical yield). The so prepared diamines are valuable for the production of polyamides by condensation with dicarboxylic acids. The condensation may be performed as described in our copending application Ser. No. 685,720, now abandoned. This process using the 1,7 diamines of the invention results in polyamides of considerable higher resistance to boiling water, higher softening temperatures, as compared to known polyamides of similar structure, as well as the same glass-clear appearance of the latter, which appearance is not altered by heating above the solidifying or coagulating temperature for a longer period.

EXAMPLE 10

A slurry is formed from 16,6 grams of terephthalic acid and 25 ml. of a methanol-water mixture (1:1), and 17,2 grams of 4,4-dimethyl-1,7-diaminooctane is added thereto. The mixture is heated to the boiling point, and additional methanol-water mixture is added dropwise until a clear solution is obtained. This solution is cooled, 100 ml. of benzene is added thereto, the reaction mixture being stirred for 30 minutes at 5° C., and then the solution is filtered. The thus-obtained salt is washed with cold benzene and dried under vacuum at 50° C. The yield is 31 grams, corresponding to 91.6% of the theoretical yield.

Under an atmosphere of pure nitrogen, 20 grams of said salt is melted in a bomb tube with 10 grams of boiled, distilled water. The tube is sealed airtight and is introduced into an autoclave which is partically filled with water. The autoclave with its contents is heated for 2½ hours and is then left under the steam pressure which develops for 3 hours at 225° C. After cooling, the bomb tube is withdrawn from the autoclave, opened, and the precondensate-water mixture contained therein is transferred to a distillation flask provided with a stirrer. After purging the flask several times with extremely pure nitrogen, the temperature is elevated during the course of 3 hours to 270° C. and the reaction mixture is maintained at this temperature for two hours, the melt assuming an increasing degree of viscosity. Thereafter, a vacuum of about 10 torr is applied for another 30 minutes. The highly viscous melt solidifies, upon cooling, to a glass-clear, colorless mass, the Vicat value (temperature at which the finished article becomes too soft to withstand stresses and to keep its shape) of which is determined to be 169° C. The relative viscosity of a solution containing 1 g. of the polymer in 100 ml. of a solution containing concentrated sulfuric acid, determined at 25° C. in a capillary viscosimeter is 2.3.

The polymer can readily be shaped into a foil (film) of a thickness of about 0.2 mm. by means of a hydraulic press. A polyamide produced according to Example 10 from 16.6 grams of terephthalic acid, 14.2 grams of a mixture of 2,5,5- and 3,3,5 - trimethylhexamethylenediamine, and 2.6 grams of hexamethylenediamine is subjected to the same procedure. Both films are placed in boiling water. The sample produced in accordance with the present invention does not change after several hours of boiling, while the latter comparison sample exhibits turbid areas after about 20 minutes and, after one hour of boiling, is interspersed with bubbles and conglutinated. Upon boiling in ethanol, the sample produced according to the invention becomes cloudy, but retains its original, while the comparison sample is partially dissolved and partially sintered together into a tacky mass.

What is claimed is:

1. A saturated ketonitrile of the formula:

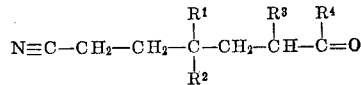

wherein $R^1$ and $R^2$ are 1 to 4 carbon atom alkyl groups; $R^3$ is hydrogen or a 1 to 4 carbon atom alkyl group; and $R^4$ is phenyl or a 1 to 4 carbon atom alkyl group; wherein further $R^3$ and $R^4$ may, together with the carbon atoms to which they are directly attached, be a carbocyclic ring of 5 or 6 carbon atoms.

2. A ketonitrile as claimed in claim 1, wherein all of said R's are methyl.

3. A ketonitrile as claimed in claim 1, wherein said $R^1$, $R^2$ and $R^4$ are methyl and $R^3$ is hydrogen.

4. A ketonitrile as claimed in claim 1, wherein said $R^1$, $R^2$ and $R^3$ are methyl and said $R^4$ is ethyl.

5. A ketonitrile as claimed in claim 1, wherein said $R^1$, $R^2$ and $R^3$ are methyl and said $R^4$ is iso-propyl.

6. A ketonitrile as claimed in claim 1, wherein said $R^1$ and $R^2$ are methyl, said $R^3$ is n-pentyl and said $R^4$ is phenyl.

7. A ketonitrile as claimed in claim 1, wherein said $R^1$ and $R^2$ are methyl and said $R^3$, $R^4$ and their attached carbon atoms are cyclohexyl.

8. A ketonitrile as claimed in claim 1, wherein said $R^1$ is ethyl, said $R^2$ is n-butyl, said $R^3$ is hydrogen and said $R^4$ is methyl.

9. Process of producing saturated ketonitriles as claimed in claim 1, comprising subjecting a compound of the formula:

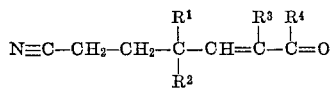

to hydrogenation with hydrogen at a temperature of about −20 to +70° C. at a hydrogen pressure of up to about 50 atmospheres in contact with a catalyst which is a reduced platinum oxide or a reduced palladium oxide.

10. Process claimed in claim 9 carried out at about 0 to 40° C.

11. Process claimed in claim 9 carried out in the presence of a substantially inert solvent as the reaction medium.

12. Process claimed in claim 9, wherein said catalyst is a solid deposited on a carrier.

References Cited

UNITED STATES PATENTS

| | | | |
|---|---|---|---|
| 2,437,906 | 3/1948 | Bruson et al. | 260—465.1 X |
| 2,386,736 | 10/1945 | Bruson | 260—465.1 |
| 2,594,489 | 4/1952 | Patrick, Jr. | 260—465.1 |
| 3,007,931 | 11/1961 | Simpson, et al. | 260—465.1 X |
| 3,079,399 | 2/1963 | Exner | 260—465.1 X |

OTHER REFERENCES

Peterson et al., J.A.C.S., 89, p. 5910, Nov. 8, 1967.

JOSEPH PAUL BRUST, Primary Examiner

U.S. Cl. X.R.

260—78 R, 465 R, 465.1, 465.4, 482, 534, 583 P, 583 R, 585 C